United States Patent

Cody et al.

[11] Patent Number: 6,056,636
[45] Date of Patent: May 2, 2000

[54] METHOD AND MEANS FOR MAKING AND CONVEYING AN EXTRUDED SAUSAGE STRAND

[75] Inventors: Daniel J. Cody, Madison, Wis.; David Hamblin, Norwalk; Steven P. Hergott, West Des Moines, both of Iowa; Wendell J. Holl; David C. Nordby, both of Madison, Wis.; Michael S. Simpson, Norwalk; Brent M. Veldkamp, Cumming, both of Iowa

[73] Assignee: Townsend Engineering Company, Des Moines, Iowa

[21] Appl. No.: 09/182,533

[22] Filed: Oct. 29, 1998

[51] Int. Cl.[7] .................................................. A22C 11/02
[52] U.S. Cl. ............................................. 452/51; 452/179
[58] Field of Search ............................... 452/51, 187, 179

[56] References Cited

U.S. PATENT DOCUMENTS

| | | | |
|---|---|---|---|
| 1,973,196 | 9/1934 | Baker | 107/7 |
| 2,212,348 | 8/1940 | Ludington | 74/242.1 |
| 2,551,080 | 5/1951 | Allen et al. | 198/19 |
| 2,725,970 | 12/1955 | Wullschleger | 198/19 |
| 3,191,222 | 6/1965 | Townsend . | |
| 3,204,844 | 9/1965 | Wallace | 226/104 |
| 3,264,679 | 8/1966 | Moekle . | |
| 3,296,657 | 1/1967 | Moekle . | |
| 3,533,495 | 10/1970 | Wallce | 198/20 |
| 3,850,566 | 11/1974 | Moore | 425/387 |
| 4,218,003 | 8/1980 | Plewa et al. | 452/51 |
| 4,761,854 | 8/1988 | Schnell et al. . | |
| 5,085,612 | 2/1992 | Miller et al. | 452/51 |
| 5,163,864 | 11/1992 | Burger et al. | 452/51 |
| 5,174,428 | 12/1992 | Durst | 198/343.1 |
| 5,197,915 | 3/1993 | Nakamura et al. | 452/51 |
| 5,232,080 | 8/1993 | Van Essen et al. | 198/418.6 |
| 5,354,229 | 10/1994 | Markwardt et al. | 452/51 |
| 5,672,099 | 9/1997 | Takamagari et al. | 452/187 |
| 5,730,649 | 3/1998 | Vchliesser et al. | 452/51 |

FOREIGN PATENT DOCUMENTS 0 509 624 A2  10/1992  European Pat. Off. .

*Primary Examiner*—Willis Little
*Attorney, Agent, or Firm*—Zarley, McKee, Thomte, Voorhees & Sease

[57] ABSTRACT

An apparatus for producing and processing a strand of sausage or foodstuff has a sausage producing machine which produces a linked strand of sausage for deposit of loops of the strand on the hooks of a continuous conveyor. The conveyor picks up the loops of the strand at a loading station immediately adjacent the discharge end of the machine, and conveys the loops to a processing station for smoking or the like. The conveyor then moves the loops to an unloading station for removal of the strand from the conveyor, whereupon the conveyor downstream of the unloading station returns to the loading station to pick up additional product. A conveyor take-up mechanism is located immediately downstream from the loading station to permit the conveyor to cease movement at the loading station (while the casing on the machine is being replenished) while the conveyor can continue movement in the processing area. Sensors and controls interconnect the machine and the conveyor to coordinate the operational functions of each. A method of producing and processing a strand of sausage or foodstuff involves producing a linked strand of material, depositing linked loops thereof on the hooks of a moving conveyor, controlling the coordinated activity of the production of the product with the movement of the conveyor; moving the product to and through a processing station, and thence to an unloading station, while periodically stopping the movement of the conveyor and the operation of the machine while continuing the movement of the conveyor through the processing area.

36 Claims, 9 Drawing Sheets

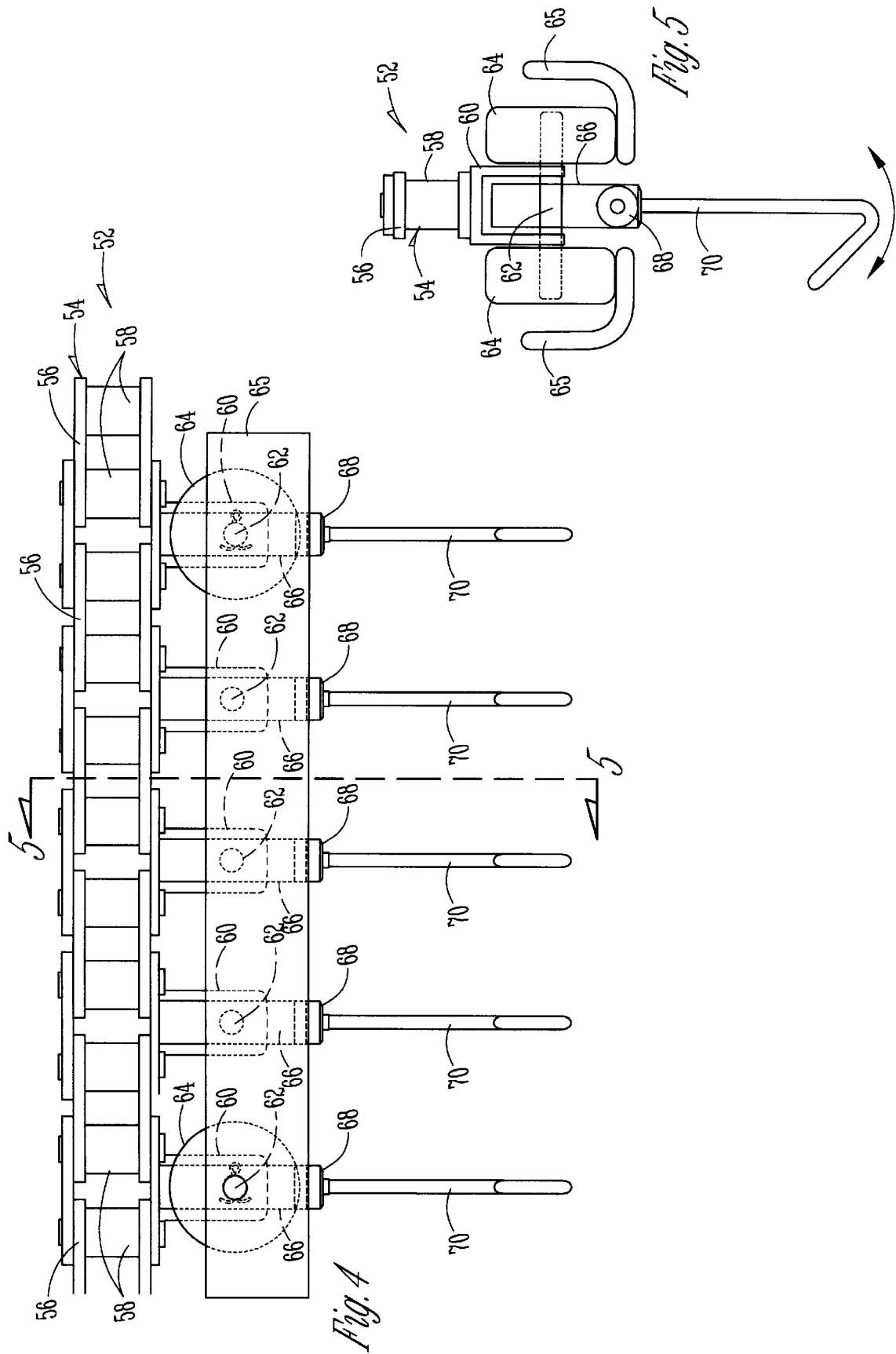

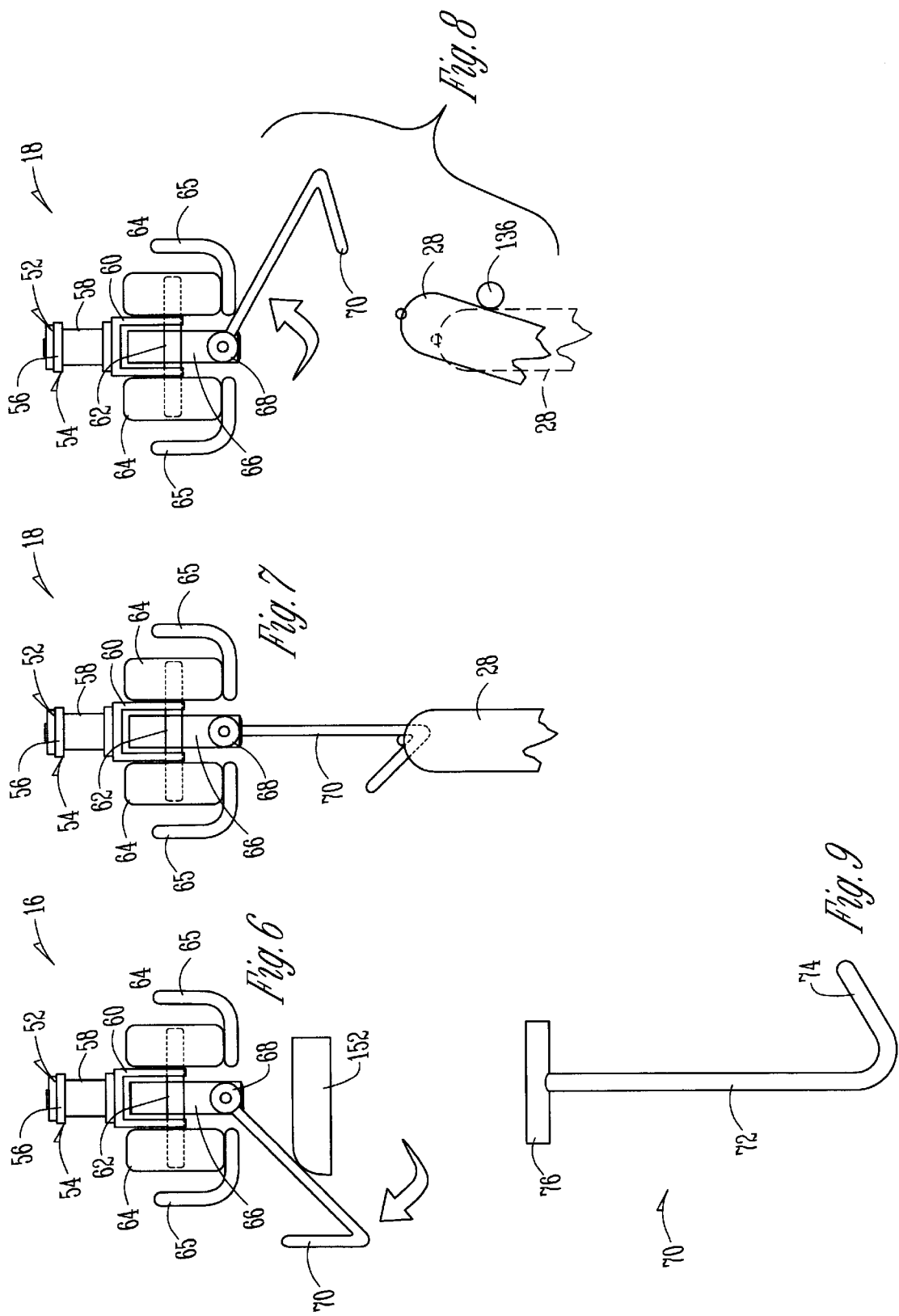

METHOD AND MEANS FOR MAKING AND CONVEYING AN EXTRUDED SAUSAGE STRAND

BACKGROUND OF THE INVENTION

Strands of sausage are made on high speed machines by extruding meat emulsion into an elongated casing. The meat-filled casing is then twisted to create sausage links. The linked strand is discharged from the sausage making machine. Loops of sausage comprising a plurality of links are deposited on moving hooks of a conveyor. The ultimate length of a given strand is determined by the length of the casing being filled. When a casing has been filled, the sausage-making machine is stopped; the casing is tied off or closed to prevent any meat emulsion from exiting the rearmost end of the casing; a new casing is then placed in position to be filled; the machine is restarted, and the cycle repeats itself.

The linked and looped sausage strand or strands are periodically removed from the conveyor or otherwise transported to a food processing station which normally cooks, smokes or treats the sausage strand before packaging for final delivery to the consumer.

With sausage machines creating up to 30,000 sausages per hour, the handling of the production of even a single machine is a significant task. Any inefficiency in the process translates into increased cost of production which is reflected in the price of the products to the consumer.

It is therefore a principal object of this invention to provide a method and apparatus for producing and processing a strand of sausage or other foodstuff which is both economical and highly efficient.

A further object of the invention is to provide a method and apparatus for producing and processing a strand of sausage or other foodstuff which is substantially continuous and which will minimize any interruptions in either the production of the strand or its subsequent processing.

A still further object of the invention is to provide a method and apparatus for producing and processing a strand of sausage which will closely coordinate the production and A processing phases of the operation.

A still further object of the invention is to provide a method and apparatus for producing and processing a strand of sausage which will allow the processing phase of the operation to continue even though the production phase is momentarily interrupted to replace casings.

These and other objects will be apparent to those skilled in the art.

SUMMARY OF THE INVENTION

An apparatus for producing and processing a strand of sausage or foodstuff has a sausage producing machine which produces a linked strand of sausage for deposit of loops of the strand on the hooks of a continuous conveyor. The conveyor picks up the loops of the strand at a loading station immediately adjacent the discharge end of the machine, and conveys the loops to a processing station for smoking or the like. The conveyor then moves the loops to an unloading station for removal of the strand from the conveyor, whereupon the conveyor downstream of the unloading station returns to the loading station to pick up additional product.

A conveyor take-up mechanism is located immediately downstream from the loading station to permit the conveyor to cease movement at the loading station (while the casing on the machine is being replenished) while the conveyor can continue movement in the processing area.

Sensors and controls interconnect the machine and the conveyor to coordinate the operational functions of each.

A method of producing and processing a strand of sausage or foodstuff involves producing a linked strand of material, depositing linked loops thereof on the hooks of a moving conveyor, controlling the coordinated activity of the production of the product with the movement of the conveyor; moving the product to and through a processing station, and thence to an unloading station, while periodically stopping the movement of the conveyor and the operation of the machine while continuing the movement of the conveyor through the processing area.

BRIEF DESCRIPTION OF THE DRAWINGS

FIG. 4 is an enlarged scale elevational view of the hook and chain portion of the conveyor;

FIG. 5 is a sectional view taken on line 5—5 of FIG. 4;

FIG. 6 is a reduced scale view similar to that of FIG. 5 showing the angular position of a conveyor hook at the loading station;

FIG. 7 is a view similar to that of FIGS. 5 and 6 but shows the conveyor chain in a travel mode after a loop of sausages has been picked up from the loading station;

FIG. 8 is a view similar to FIGS. 6 and 7 but shows the chain and hook in a position at the unloading station just after a loop of sausages has departed the conveyor;

FIG. 9 is an enlarged scale side elevational view of a conveyor hook used in this invention;

DESCRIPTION OF THE PREFERRED EMBODIMENT

Figure 1:
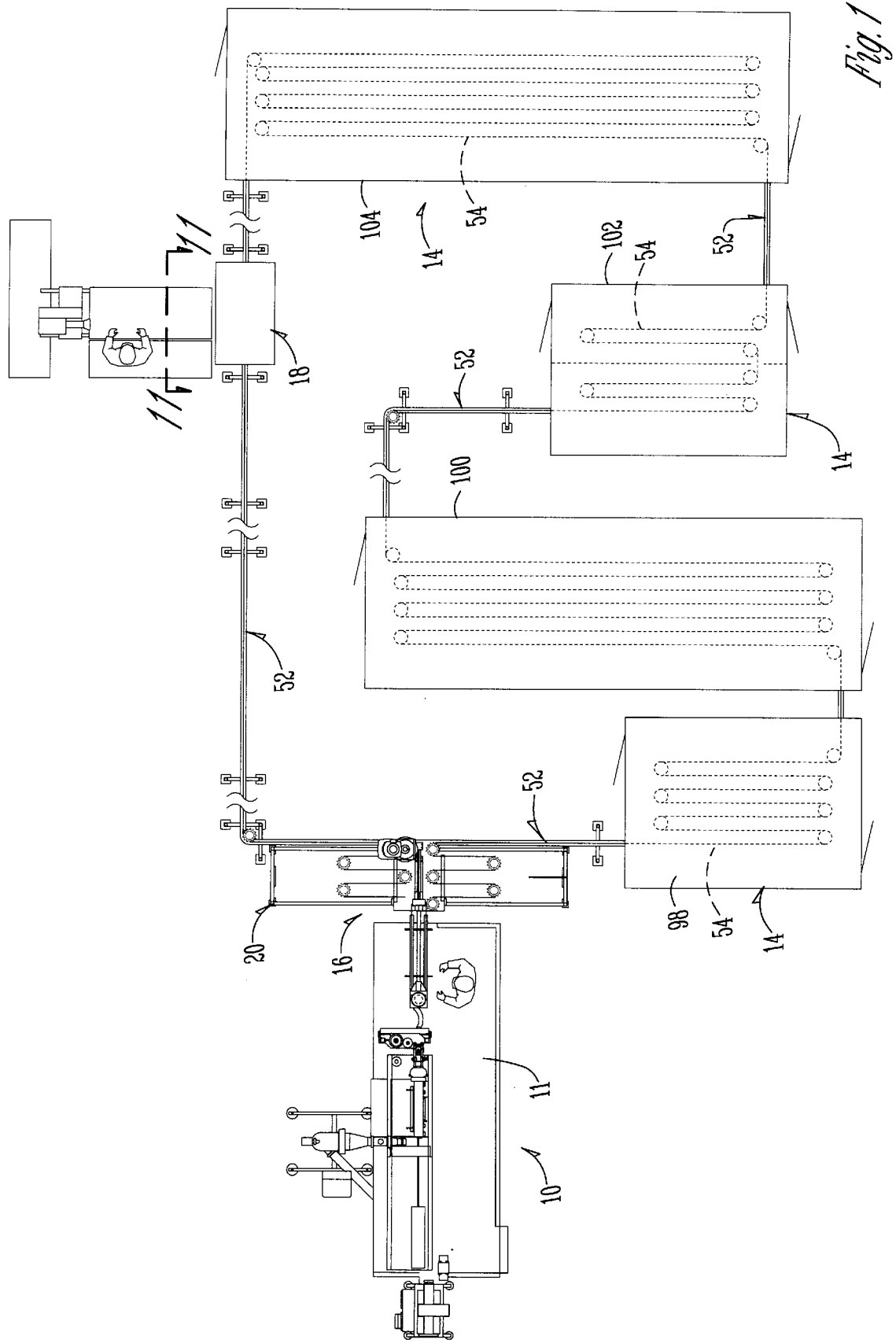
FIG. 1 is a schematic plan view of the device of this invention.

With reference to FIG. 1, a conventional sausage making machine 10 has an operator's platform 11 and is positioned upstream of a conveyor 52. A food processing station 14 which will be discussed hereafter is located downstream of the machine 10 and immediately downstream from a loading station 16. An unloading station 18 is located immediately downstream of the food processing station 14. A conveyor chain take up assembly 20 is located immediately downstream of the loading station 16.

Figure 10:
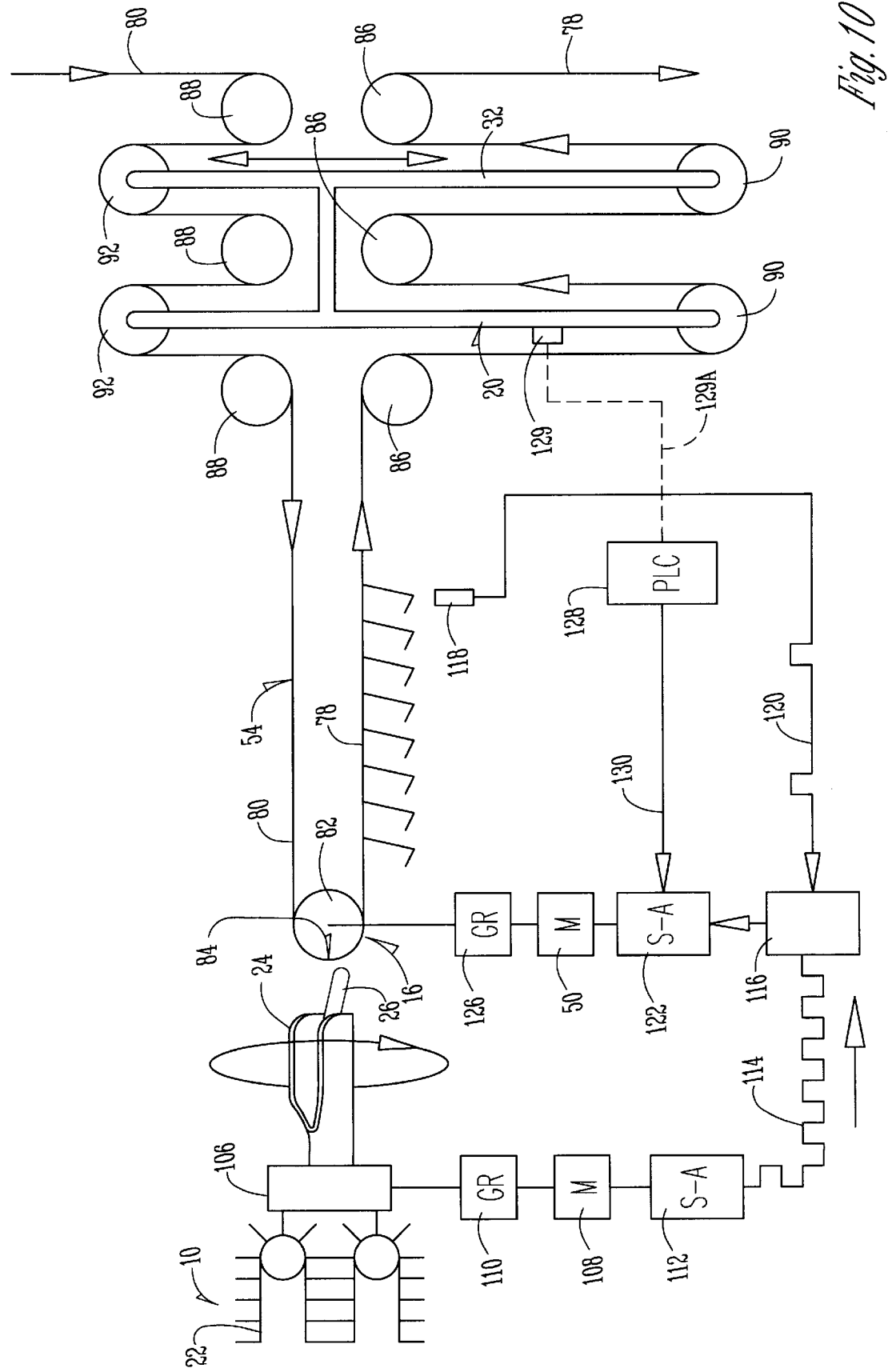
FIG. 10 is a schematic view showing the interfaced relationship between the sausage making machine and the conveyor.

Machine 10 has a conventional linker 22 which discharges a linked product through a discharge horn 24 in the form of a sausage strand 26 (FIG. 10). The discharge horn is preferably rotatable, but can be stationary, and is adapted to create sausage loops 28 comprised of several linked sausage elements produced from linker 22. The discharge horn 24 is best shown in FIG. 10.

Figure 2:
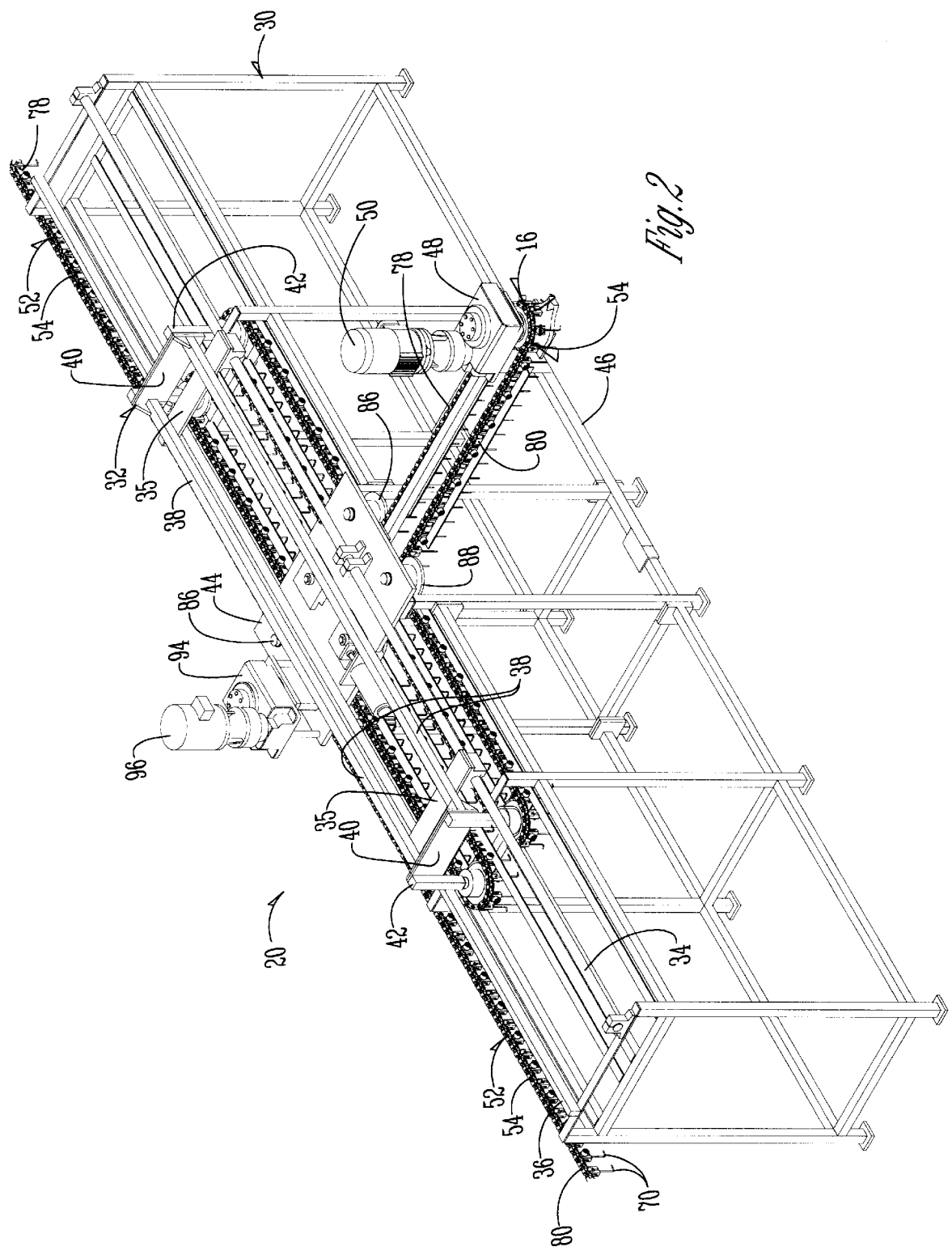
FIG. 2 is a large scale perspective view of the loading station of the conveyor as viewed generally from the location of the sausage making machine.
Figure 3:
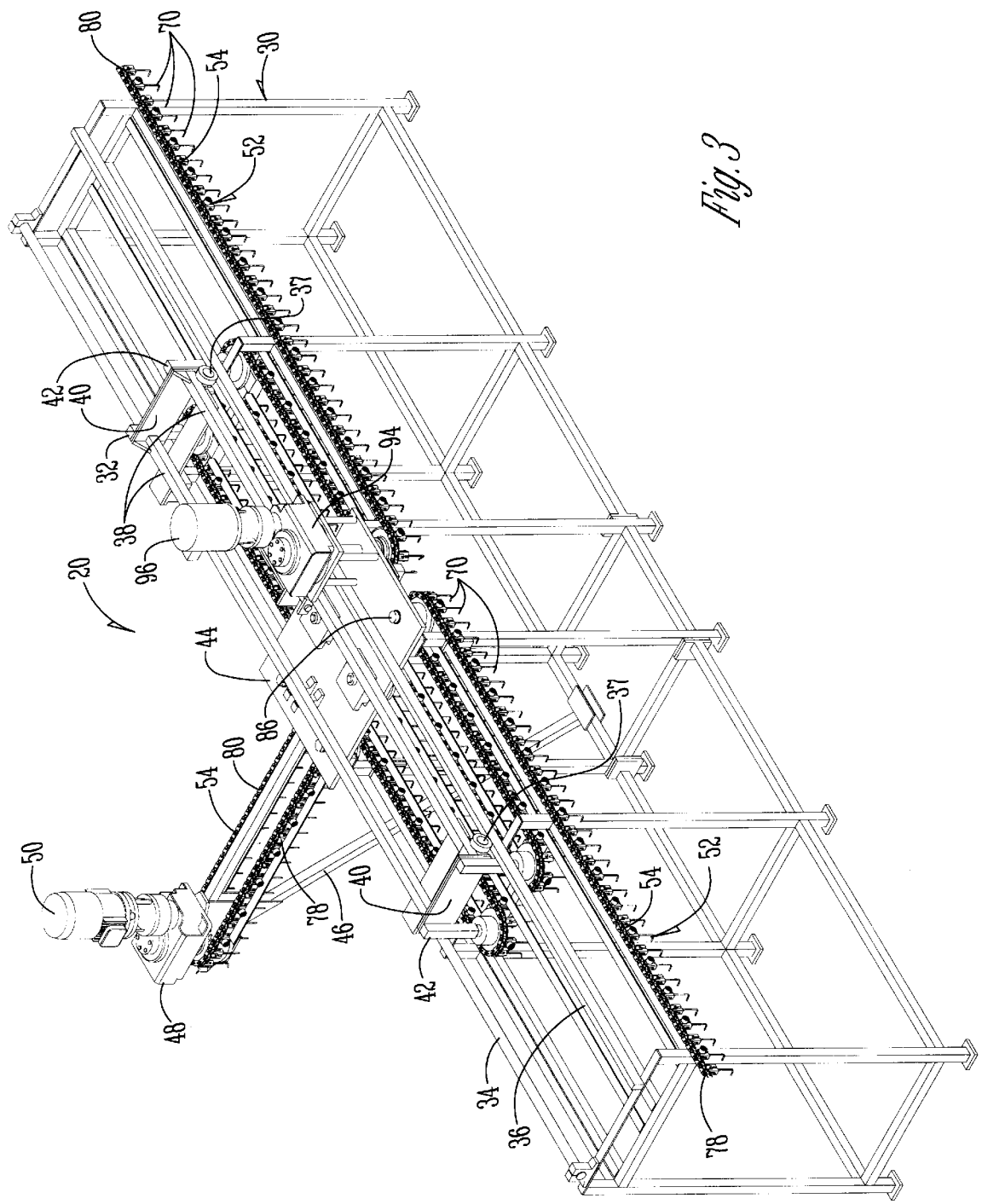
FIG. 3 is a perspective view taken from an opposite direction from that seen in FIG. 2.

A support frame 30 (FIGS. 2, 3 and 11) slidably supports subframe 32 (FIGS. 2 and 3). An elongated cylindrical rail 34 is supported on frame 30 upon cross members 35. A rectangular rail 36 is spaced from but parallel to rail 34 and is also supported by cross member 35. The subframe 32 has wheels 37 (FIG. 3) which movably support the subframe on rails 34 and 36. A pair of parallel struts 88 on subframe 32 extend between end members 40 which are supported on four vertical posts 42 (FIGS. 2 and 3).

A horizontal mounting plate 44 (FIGS. 2 and 3) is mounted on frame 30. A diagonal extending arm 46 extends from a lower portion of frame 30 outwardly towards loading station 16 (FIG. 3) and supports gear box 48. A loading motor 50 is also supported by frame member 46 at the loading station.

An elongated continuous chain conveyor 52 (FIGS. 4 and 5), includes a sprocket chain 54 comprised of rotatable chain links 56, chain bushings 58, and U-shaped link elements 60. With reference to FIG. 5, a horizontal shaft 62 extends through link element 60 to support wheel 64 on the opposite ends thereof. Wheels 64 run on the horizontal leg portions of opposite L-shaped tracks 65. A hook support 66 rotatably supports bearing 68 which pivotally supports hooks 70 which are thereupon adapted to pivot laterally with respect to the elongated axis of the chain 52. Hooks 70 (FIG. 9) are comprised of a vertical shank 72 which has a J-hook portion 74 at its bottom end and a horizontal bar 76 at its upper end.

As shown in FIGS. 2, 3 and 10, chain conveyor 52 has an outgoing segment 78 and a return segment 80 with respect to the loading station 16. With reference to FIG. 10, a sprocket 82 supported on frame 30 at loading station 16 has a loading position 84 (FIG. 10). Sprockets 86 and 88 are mounted on frame 30 in spaced relation to sprocket 82 so as to receive the outgoing segment 78 and the return segment 80 of chain 52, respectively. Sprockets 86 and 88 are rotatably mounted on frame 30, but are in a fixed position and do not move in a lateral direction.

Movable sprockets 90 and 92 are rotatably mounted on subframe 32. A gear box 94 (FIGS. 2 and 3) is mounted on mounting plate 44 and is operatively connected to sprocket 88. Master motor 96 is operatively connected to gear box 94. Thus, motor 96, gear box 94, and sprocket 88 supply the drive power for chain conveyor 52. A plurality of slave motors 96A (FIG. 12) to motor 96 can be connected to conveyor 52 to limit the tension on chain 54.

The food processing station 14 shown in FIG. 1 is comprised of a plurality of conventional food processing units 98, 100, 102 and 104. A plurality of sprockets are used in the units 98–104 to move the chain conveyor 52 through each of these food processing units. These units include such conventional operation as smoke houses, and the like.

It is necessary that the operation of the sausage making machine 10 be coordinated with the operation of the conveyor 52. With reference to FIG. 10, a rotational drive mechanism 106 is associated with discharge horn 24 to rotate the same in the direction of the arrow shown in FIG. 10 as the strand product 26 is being produced by the machine is discharged therefrom. The mechanism 106 is operationally connected to servo motor 108 with gear reducer 110 being located therebetween. A servo amplifier 112 is connected to the servo motor 108. The servo amplifier 112 is in communication by line 114 to counter/converter 116. A proximity switch 118 is located on frame 30 to sense the presence of loops of sausage 28 (or hooks 70) on the conveyor 52. Switch 118 is connected by line 120 to the counter/converter 116. Variable frequency drive 122 is operationally connected to AC motor 50. The AC motor 50 is operationally connected to gear reducer 126 which is operationally connected by convenient means to sprocket 82 at the loading station 16 of the conveyor 52. A PLC 128 is connected by line 130 to the variable frequency drive 122.

Figure 11:
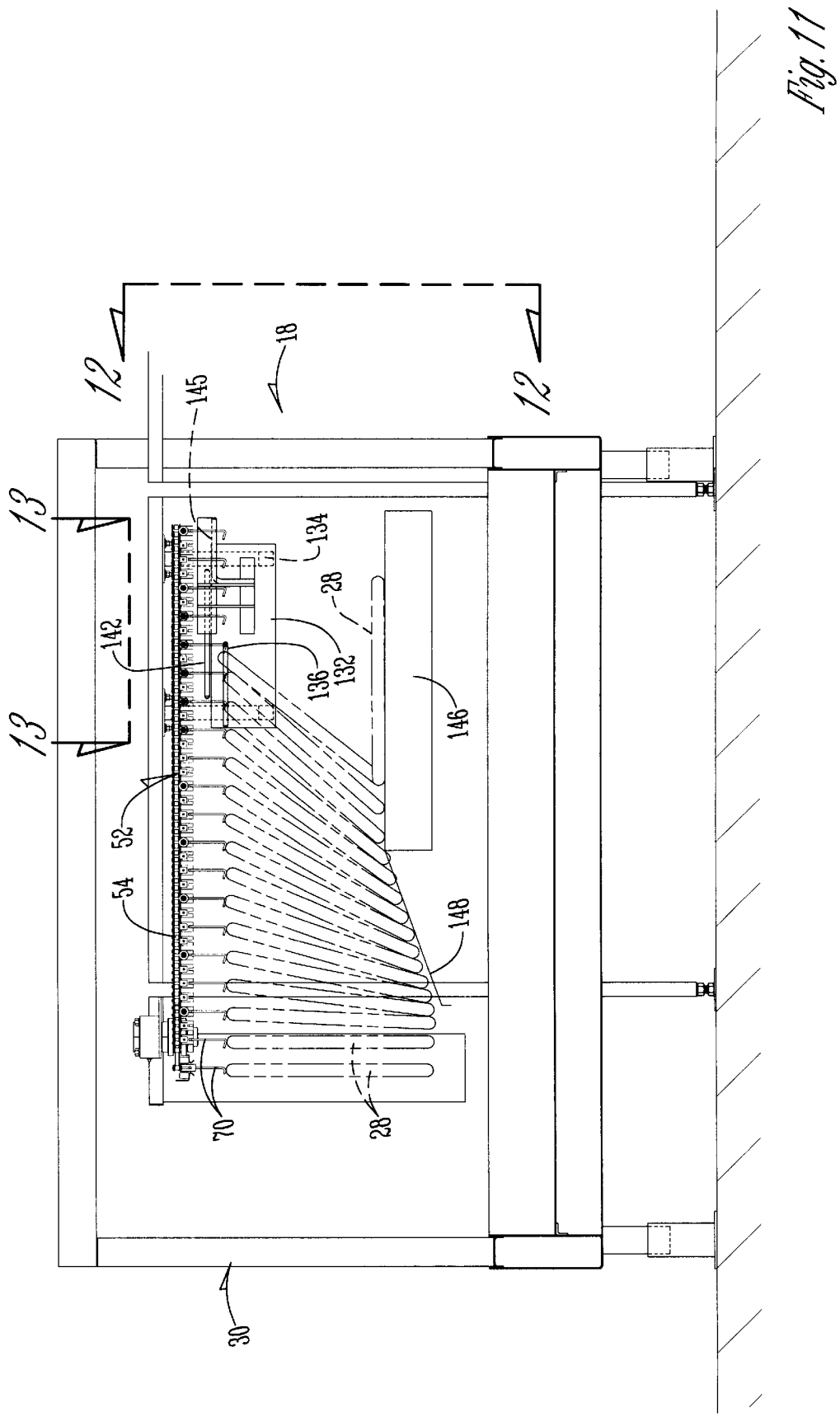
FIG. 11 is an elevational view taken on line 11—11 of FIG. 1 showing the unloading station.
Figure 12:
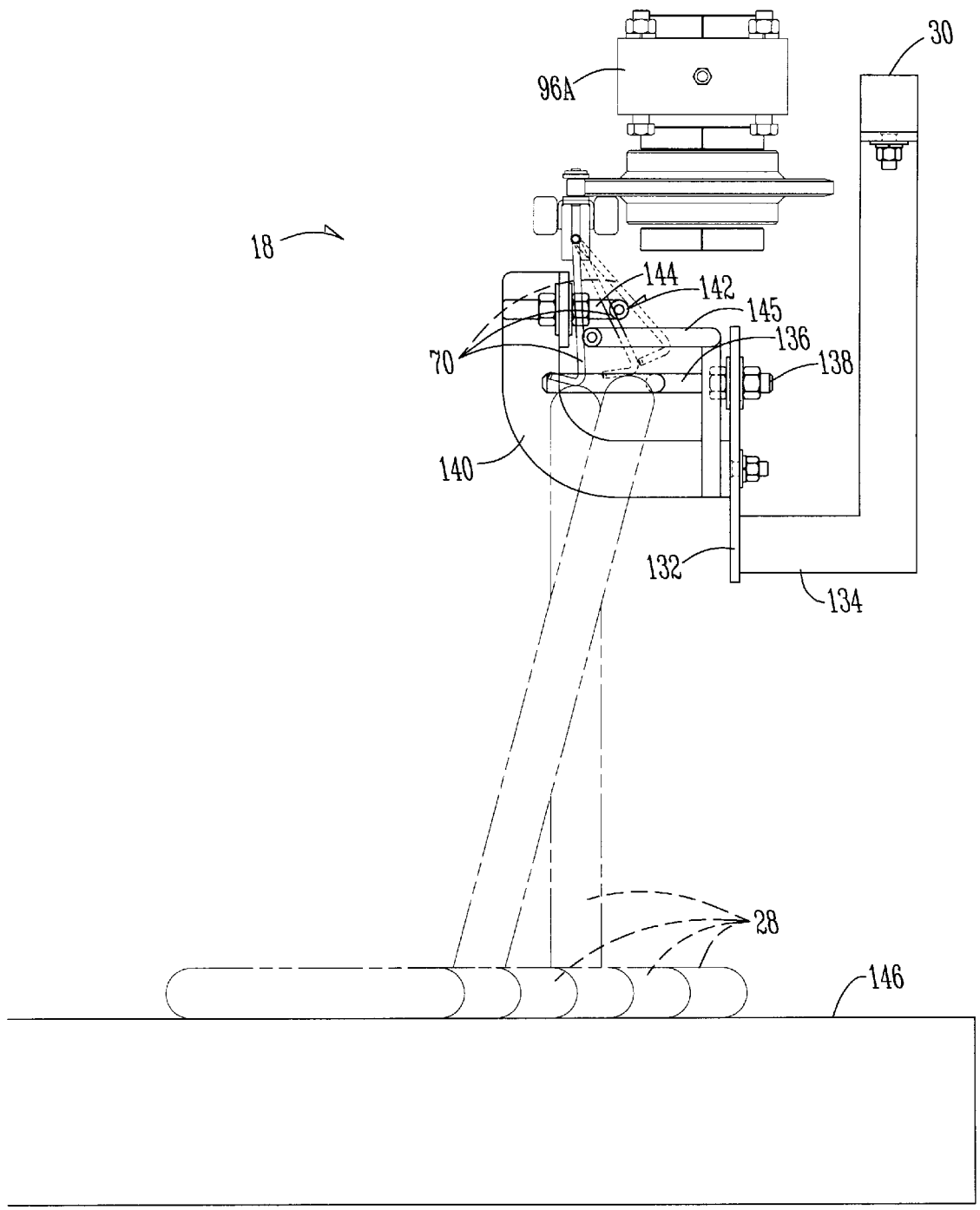
FIG. 12 is an enlarged scale elevational view as seen on line 12—12 of FIG. 11.
Figure 13:
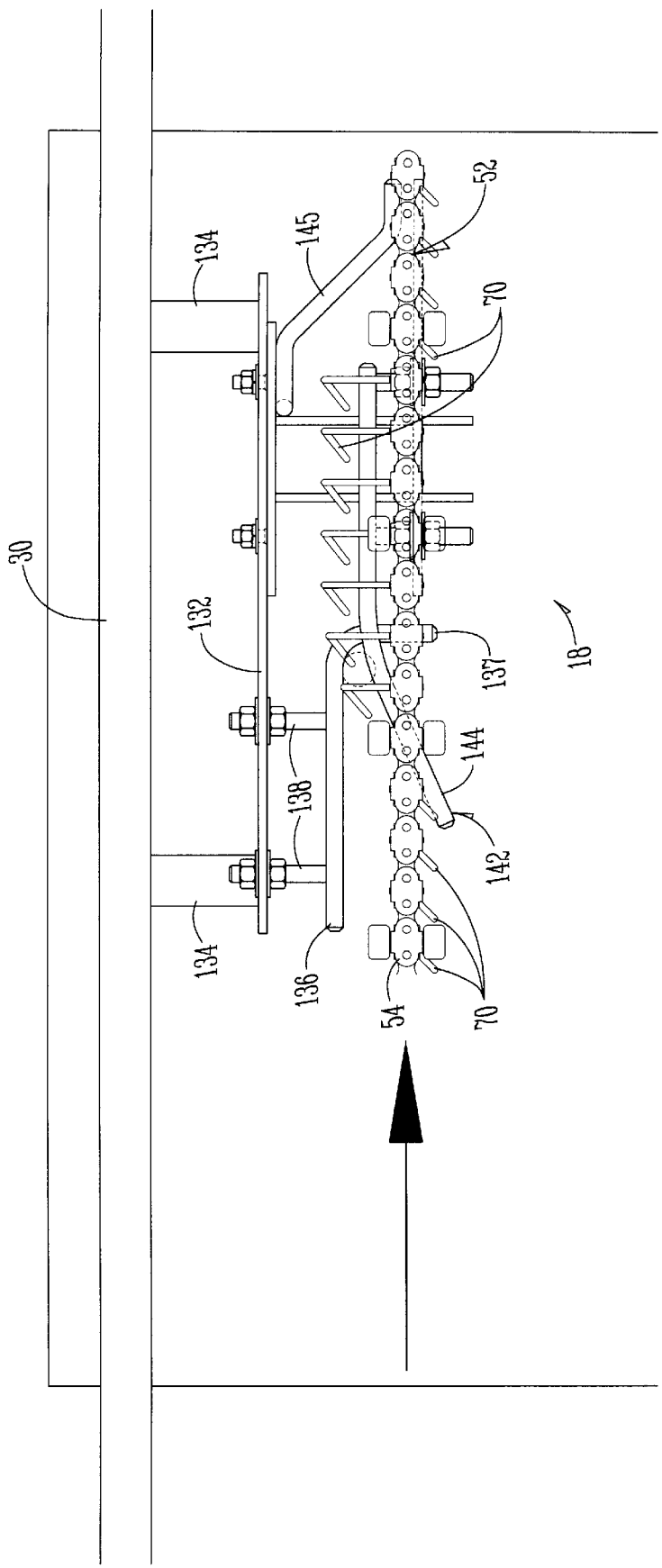
FIG. 13 is an enlarged scale elevational view of the portion outlined by the dotted lines 13—13 on FIG. 11.

The unloading station 18 is specifically illustrated in FIGS. 11, 12 and 13. With reference to FIGS. 12 and 13, a vertically disposed plate 132 is supported from frame 30 by arms 134. A horizontally disposed loop knock-off L-shaped bar 136 having an outwardly extending portion 137 is mounted to plate 132 by support bolts 138. A J-shaped support bracket 140 is also supported by plate 132 in any convenient means. Bracket 140 in turn supports hook-tilting bar 142 (FIGS. 12 and 13) and serves to tilt the hooks 70 inwardly towards frame 30 shown by the dotted lines in FIG. 12 and to a position shown by the solid lines in FIG. 13. Bar 142 has an outwardly diagonally extending portion 144 on its free end as best shown in FIG. 13. Bar 145 will engage and pivot hooks 70 back to their normal vertical position if they have not returned to that position by the effects of gravity.

A conveyor table is located below the unloading station 16 and has an inclined ramp 148 on the upstream end thereof to engage the incoming loops 28 to move them to the inclined position shown best in FIG. 11.

As shown in FIG. 6, a cam 152 is located at the loading station 16 to cause the oncoming hooks 70 to tilt outwardly and rearwardly to the position shown in FIG. 6 to better present the hook for receiving the oncoming sausage strand 26 to form loops 28. The forming of loops from an oncoming sausage strand is conventional in the art, but the tilting of the hooks 70 in the manner shown in FIG. 6 greatly facilitates this process.

As is well understood in the industry, the sausage making machine 10 produces a sausage strand 26 that is encased within a telescopically compressed casing material which has an extended length of up to 30 feet or so. When a first length of casing material is filled, it is necessary to stop the operation of the sausage machine, tie off the filled casing material, and provide a second length of casing material so that the machine can commence operation again. This ordinarily can be accomplished in a very few seconds by an experienced operator. Thus, the machine 10 and the conveyor 52 need to be carefully coordinated to enhance this process.

At the same time, it is not desirable to have the chain conveyor 52 stopped downstream of the loading station 16 when the loading station 16 has been stopped to permit a new casing to be placed in operation in the sausage making machine. To achieve these objectives, the control system set forth in FIG. 10 and described heretofore facilitates the coordination of the sausage making machine 10 and the conveyor 52, and also permits the conveyor 52 to continue taking sausage loops 28 through the food processing station 14 even though the operation at the loading station 16 has been briefly interrupted.

The sausage making machine 10 communicates with the conveyor 52 through the control system set forth in FIG. 10. Variations of speed and time can be imposed in the interface between these two components. The combination of the looper horn 24, servo motor 50 and servo amplifier 112 along with gear reducer 110 are driven at a specified velocity determined by a predetermined ratio of the speed of linker or linker chain 22. Since the rotation of the looper 24 is a servo driven system, there is a feedback from the driven servo motor 108 to the driving servo amplifier 112. The information being delivered back to the servo amplifier 112 is a dual square wave (quadrature) pulse train. The pulse train, because of the gear reduction, is typically 24,000 pulses per every revolution of the looper 24. Typically, there is an option in the servo amplifier 112 to generate a replica of the feedback pulse train and a further option to divide it by a constant, which is preferred to have a value of 8. This would result of an output of 3,000 pulses per revolution of the looper 24.

The counter/converter 116 receives pulses from the servo amplifier 110 and starts to send a speed command to the variable frequency drive 122. This speed command could be 0–10 vdc, 4–20 mA, or other such forms. The magnitude of the speed command and its acceleration and deceleration are driven by the incoming pulse frequency. The speed command is interpreted by the variable frequency drive 122 as a specific output frequency which in turn determines the RPM of the AC motor 52, which thereupon influences through the gear reducer 16 the speed of the conveyor hooks 70.

The conveyor chain 52 and the related hook system also has a feedback source. The proximity switch 118 which detects the presence of a hook, transmits a pulse to the counter/converter 116 which compares the count of pulses of the incoming pulse train to the frequency of the proximity switch 118 and makes some adjustments to the speed command to the variable frequency drive 122. The foregoing typifies the normal production operation.

When the operation of the sausage machine 10 is interrupted to either change a casing or when the operator goes on break, the variable frequency drive interrupts the operation of motor 50 so that a hook 70 stops at the 9:00 o'clock position of sprocket 82, as viewed in FIG. 10 so that when operation of the sausage machine 10 is resumed, a hook is immediately in place to commence the grasping of the oncoming sausage strand 26 whereupon a first loop 28 can be commenced without delay. Further, when the operation of the machine 10 has been interrupted, the motor 50 is not moving the outgoing segment 78 or the incoming segment 80 of chain 54. However, master motor 96 of the conveyor 52 continues to provide operational power to the chain 54 so that the previously loaded sausage loops 28 move through the food processing station 14 and the unloading station 18. The conveyor chain take-up assembly 20 (sometimes called a "buffer") comes into play at that point wherein the subframe 32 moves in an upward direction on the rails 34 and 36. (FIG. 10). The dimensions of the subframe 32 are such, and the drive speed of the master motor 36 is such, that the conveyor chain take-up assembly 20 will require sufficient time to move to its take-up position so that a new sausage casing can be installed on machine 10 to permit machine 10 to restart its operation. An override circuit in the PLC 128 will override master motor 96 in the event that the machine 10, and motor 50, do not commence to operate before the conveyor chain take-up assembly has reached its maximum displacement. The conveyor chain take-up assembly 20 which forms a part of this invention is not novel per se, but its application to this environment is deemed to be novel. Sensor 129 communicates with PLC 128 by line 129A to monitor the movement of chain take-up assembly 20 and the lateral position thereof.

As previously indicated, the hooks 70 are tilted outwardly by cam 152 as they arrive at and pass the 9:00 o'clock position of sprocket 82 at the loading station 16. This enhances the grasping of the strand 26 by the hook and facilitates the formation of loops 28. It should also be noted that the movement of hooks 70 at loading station 16 do not intersect the rotation of the looper horn 24 to insure that there is never any mechanical interference between the hooks and the looper horn. Also, the PLC 128 will always cause a hook 70 to stop at the 9:00 o'clock position of sprocket 82 whenever motor 50 ceases to provide power so as to expedite the resumption of loop making as soon as machine 10 becomes operative again.

At the unloading station 18, as best shown in FIGS. 11, 12 and 13, it has been discovered that the attitude of the loops 28 for removal purposes from the hooks 70 is best accomplished by inducing the loops to the inclined position shown in FIG. 11 as the bottoms of the loops engage the ramp 148. As the inclined loops reach the level of the top of table or conveyor 146, the hooks 70 are engaged by the outward diagonally extending portion 144 of bar 142 which causes the hooks to pivot inwardly towards frame 30. (See the dotted lines of numeral 70 in FIG. 12.) Immediately thereafter, the loops themselves are moved into engagement with the abutting outwardly extending portion 137 (FIG. 13) of loop knock-off bar 136 which easily forces the loop out of engagement with the lower J-hook portion 74 of the hook.

It should be understood that the system of FIG. 1 can have superimposed upon itself another set of components directly above the components of FIG. 1 wherein a "two story" system could be simultaneously operated. Similarly, the system of FIG. 1 could have two loading and/or unloading stations to increase the capacity of the system. This would require some alternate spacing of groups of loops 28 on the conveyor 52.

From the foregoing, it is seen that sausage strands can be easily and quickly produced by conventional sausage making machines 10, and then be provided in a very efficient way to an adjacent conveyor for a quick and efficient delivery to a food processing station, and thence to an unloading station. The operation of the sausage making machine and the conveyor are closely coordinated to maximize efficiency, and this efficiency is enhanced by permitting the conveyor to move loops of sausage through the food processing station while the loading station is momentarily out of operation while the sausage machine is being resupplied with sausage casing. It is therefore seen that this invention will achieve at least all of its stated objectives.

What is claimed is:

1. A system for processing an elongated strand of food material, comprising, a machine for producing an elongated food strand having a discharge station, an elongated continuous conveyor chain mounted on a support frame and having at least one loading station, a plurality of shaped hooks having a normally vertical shank with an upper end secured to said conveyor chain and a lower end terminating in a hook portion, the loading station of the conveyor chain being located adjacent the discharge station of the machine to receive loops of the strand on said hooks from the machine, the conveyor chain being disposed in a horizontal plane and having a first portion departing from its loading station, and a second portion returning to the loading station, the path of movement of the first and second portions being non-symmetrical, and power means for moving the conveyor chain along a horizontal path on the support frame.

2. The system of claim 1 wherein the conveyor chain passes through a movable chain take-up mechanism to permit segments of said conveyor chain to move at different velocities at certain times.

3. The system of claim 2 wherein a master control means is associated with the machine and the power means to sense the operating position of the chain take-up mechanism to permit the operation of the machine or said power means to take compensatory action if the operating position of the chain take-up mechanism approaches its capacity to take up chain resulting from a change or velocity of a chain segment.

4. The system of claim 2 wherein the velocity of the segment at the loading station can be zero for a period of time.

5. The system of claim 2 wherein the power means comprises a loading motor connected to the conveyor chain at the loading station, and a master motor is connected to the conveyor chain downstream from the loading station, and control means on the machine for stopping the loading motor and the segment of the conveyor chain at the loading station, and continuing the movement of a segment of the conveyor chain downstream from the loading station to the master motor when the supply of the strand from the machine to the loading station is interrupted.

6. The system of claim 1 wherein the machine discharges the strand from an elongated horn onto the hooks of the conveyor chain.

7. The system of claim 1 wherein the machine discharges the strand from an elongated rotating horn onto the hooks of the conveyor chain.

8. The system of claim 7 wherein the path of rotation of the discharge end of the elongated horn and the path of movement of the hooks do not intersect.

9. The system of claim 1 wherein the power means is comprised of a plurality of motors connected to the conveyor chain to limit the tension of the conveyor chain.

10. The system of claim 1 wherein the upper ends of the vertical shank of the hooks are pivotally secured to the conveyor chain.

11. The system of claim 1 wherein the upper ends of the vertical shank of the hooks are pivotally secured to the conveyor chain to permit the hooks to pivot laterally with respect to the longitudinal axis of the conveyor chain.

12. The system of claim 11 wherein a cam element is located on the support frame to pivot the hooks outwardly towards the machine at the loading station to receive a loop of the strand.

13. The system of claim 11 wherein a cam element is located on the support frame to pivot the hooks laterally at the loading station to receive a loop of the strand.

14. The system of claim 1 wherein the upper ends of the vertical shank of the hooks are pivotally secured to the conveyor chain to permit the hooks to pivot laterally with respect to the longitudinal axis of the conveyor chain, a cam element on the support frame adjacent the unloading station to pivot the hooks laterally with respect to the longitudinal axis of the conveyor chain, a loop removal element at the unloading station and positioned to engage loops of the strand on the laterally pivoted hook and to cause the engaged loops to slide free from the hooks.

15. The system of claim 13 wherein the hooks are adapted to pivot laterally with respect to the longitudinal axis of the conveyor chain, a cam element at the loading station to pivot the hooks laterally with respect to the longitudinal axis of the conveyor chain.

16. The system of claim 13 wherein the hooks are adapted to pivot laterally with respect to the longitudinal axis of the conveyor chain, a cam element at the unloading station to pivot the hooks laterally with respect to the longitudinal axis of the conveyor chain.

17. The system of claim 13 wherein the hooks are adapted to pivot laterally with respect to the longitudinal axis of the conveyor chain, a cam element on the support frame adjacent the unloading station to pivot the hooks laterally with respect to the longitudinal axis of the conveyor chain, a loop removal element at the unloading station and positioned to engage loops of the strand on the laterally pivoted hook and to cause the engaged loops to slide free from the hooks.

18. The system of claim 1 wherein the upper ends of the vertical shank of the hooks are pivotally secured to the conveyor chain to permit the hooks to pivot laterally with respect to the longitudinal axis of the conveyor chain, a loop removal element at the unloading station and positioned to engage loops of the strand to cause the loops to slide free from the hooks.

19. The system of claim 13 wherein a loop removal element is at the unloading station and positioned to engage loops of the strand to cause the loops to slide free from the hooks.

20. The system of claim 1 wherein the hook portions on the lower ends of the vertical shanks extend diagonally outwardly from a vertical plane passing through the center axis of the conveyor chain, and extend rearwardly with respect to the direction of travel of the conveyor chain.

21. The system of claim 1 wherein a speed control means on said machine is operatively connected to the conveyor to enable the operating speeds of the machine and the conveyor chain at its loading station to be coordinated so that selectively the machine can deliver loops of strand to intermittent hooks on the conveyor chain wherein one or more empty hooks without loops of strands thereon will appear between those hooks that support loops of the strand.

22. The system of claim 1 wherein a control means is on the machine, the control means operatively connected to the conveyor chain so that when a first strand discharged from the machine is terminated, the conveyor chain at its loading station will stop in sufficient time so that the next hook for picking up a strand loop will not pass the loading station but will be in position at the loading station to receive the next strand loop when the machine commences to discharge strand loops again.

23. The system of claim 2 wherein the take-up mechanism comprises a sub-frame slidably mounted on the support frame adjacent the loading station, a first drive sprocket on the support frame at the loading station with a length of conveyor chain extending therearound and having incoming and outgoing lengths of the conveyor chain extending therefrom at least two spaced outgoing sprockets on the support frame in alignment with the outgoing length of conveyor chain, two spaced incoming sprockets on the support frame laterally aligned with the outgoing sprockets and in alignment with the incoming length of conveyor chain, at least first and second take up sprockets mounted on the sub-frame, said first take-up sprocket movable with the sub-frame in a lateral direction with respect to the two outgoing sprockets on a lateral path extending therebetween, said second take-up sprocket moveable on the sub-frame to move in a lateral direction with the sub-frame with respect to the two incoming sprockets on a lateral path extending therebetween, a first motor to rotate the drive sprocket, a second motor operatively connected to the chain conveyor to move the same along a continuous path, control means on the machine to control the first and second motors, the incoming length of conveyor chain extending from the power sprocket, thence around an incoming sprocket, thence around the first take-up sprocket, and thence around the other incoming sprocket; the outcoming length of conveyor chain extending from the power sprocket, thence around an outgoing sprocket, thence around the second take-up sprocket, and thence around the other outgoing sprocket, so that if the rotational speed of the power sprocket varies with the output speed of the second motor, the take-up sprockets will move in unison in one lateral direction with the sub-frame when the rotational speed of the power sprocket decreases, and will move in unison in an opposite lateral direction with the sub-frame if the rotational speed of the power sprocket increases.

24. The system of claim 23 wherein at least one sensor is present to monitor the lateral position of the take-up sprockets.

25. The system of claim 23 wherein the second motor is operatively connected to one of the incoming sprockets.

26. The system of claim 1 wherein J-hooks mounted on the chain are pivotally secured thereto for lateral pivoting with respect to the longitudinal axis of the chain, a cam associated with the chain at the loading station to cause the hooks to pivot outwardly and rearwardly at the station from a normally vertical position to facilitate the grasping of a loop of strand material at the loading station, and power means connected to the chain for longitudinally moving the same, the J-hooks comprising a normally vertically shank pivoted for lateral movement by an upper end, and terminating in a hook portion at its lower end, with the hook portion extending in an outwardly and rearwardly direction with respect to the direction of travel of the chain.

27. The system of claim 26 wherein the loading station includes a chain sprocket which engages a segment of chain having incoming and outgoing portions separated by a circular bite portion extending around a portion of the sprocket, the cam being associated with the sprocket to cause the shanks of the chain to move outwardly and rearwardly as the chain is moved around a portion of the sprocket.

28. The system of claim 27 wherein the bite portion is semicircular and the incoming and outgoing segments are parallel.

29. The system of claim 27 wherein a drive motor is operatively connected to the sprocket.

30. The system of claim 2 wherein the movable chain take-up mechanism includes incoming and outgoing chain segments extend around a plurality of fixed sprockets on the frame, and extend around at least a pair of oppositely spaced chain take-up sprockets on a laterally positioned sub-frame slidably mounted on the support frame.

31. The system of claim 30 wherein a master drive motor is rotatably connected to one of the fixed sprockets, and a drive motor is connected to the chain sprocket, and a control means is operatively connected to said motors to vary the rotational speed thereof at times.

32. The system of claim 31 wherein said control means is located on a strand making machine delivering strand to the loading station for deposit on the J-hooks.

33. The system of claim 32 wherein the conveyor chain extends from the fixed sprockets along a path through a strand processing station.

34. The system of claim 33 wherein a strand unloading station is located downstream from the strand processing station.

35. The system of claim 33 wherein a plurality of drive motors are located along the length of chain beyond the fixed sprockets and are connected to drive the conveyor chain.

36. The system of claim 35 wherein said plurality of motors are slave-connected to the master drive motor.

* * * * *